US010827726B2

(12) United States Patent
Rosales

(10) Patent No.: US 10,827,726 B2
(45) Date of Patent: Nov. 10, 2020

(54) CHICKEN NESTING TRAILER—CHICKEN CAMP

(71) Applicant: Amilkar Nunez Rosales, Houston, TX (US)

(72) Inventor: Amilkar Nunez Rosales, Houston, TX (US)

(*) Notice: Subject to any disclaimer, the term of this patent is extended or adjusted under 35 U.S.C. 154(b) by 64 days.

(21) Appl. No.: 16/278,750

(22) Filed: Feb. 19, 2019

(65) Prior Publication Data

US 2020/0260695 A1    Aug. 20, 2020

(51) Int. Cl.
*A01K 31/16*   (2006.01)
*A01K 31/18*   (2006.01)
*C02F 9/00*    (2006.01)
*A01K 31/00*   (2006.01)

(52) U.S. Cl.
CPC ........... *A01K 31/165* (2013.01); *A01K 31/16* (2013.01); *A01K 31/18* (2013.01); *C02F 9/005* (2013.01); *A01K 31/007* (2013.01)

(58) Field of Classification Search
CPC ...... A01K 31/18; A01K 31/16; A01K 1/0035; A01K 31/00; A01K 31/02; A01K 31/005; A01K 31/007; A01K 31/06; A01K 31/165
See application file for complete search history.

(56) References Cited

U.S. PATENT DOCUMENTS

| 5,143,021 A * | 9/1992 | Shaley ................. A01K 31/10 119/330 |
| 2012/0210946 A1 * | 8/2012 | Hilgers ................. A01K 31/22 119/443 |
| 2012/0255498 A1 * | 10/2012 | Pitzer .................... A01K 31/22 119/311 |
| 2015/0351370 A1 * | 12/2015 | Donker ............... A01K 31/007 119/347 |

OTHER PUBLICATIONS

Chicken Caravan; Ultimate Chicken Egg Shed—Fully Portable With Solar; https://www.youtube.com/watch?v=S77LcBsLSno; accessed on Jun. 18, 2020; published May 23, 2012. (Year: 2012).*
Homesteadonomics; "Chicken Coop Tour—Rainwater Harvesting, Solar, DIY Feeder, . . . and more!;" https://www.youtube.com/watch?v=Bgu7f5cq6cQ; accessed on Jun. 18, 2020; published Apr. 27, 2018. (Year: 2018).*

* cited by examiner

*Primary Examiner* — Daniel J Colilla
(74) *Attorney, Agent, or Firm* — Chen-Chi Lin

(57) ABSTRACT

A free grazing egg harvester device comprises: a plurality of solar panel; a communication antenna; a front access door; a plurality of roll away nest boxes; a side access door; a plurality of nest gates; a water reservoir; a plurality of water nozzles; a plurality of wheels; and a plurality of roosts. An actuator is provided to open and close the plurality of nest gates. The actuator has a piston that further has an extension rod. The extension rod has two arms that push/pull the plurality of nest gates by extending and contracting the extension rod. The device has many advantages like reduction in fixed infrastructure investments, mobile nests for production of free grazing eggs, energy autonomy, storage and filtration of rainwater, real-time remote data transmission is available in any type of communication device.

3 Claims, 10 Drawing Sheets

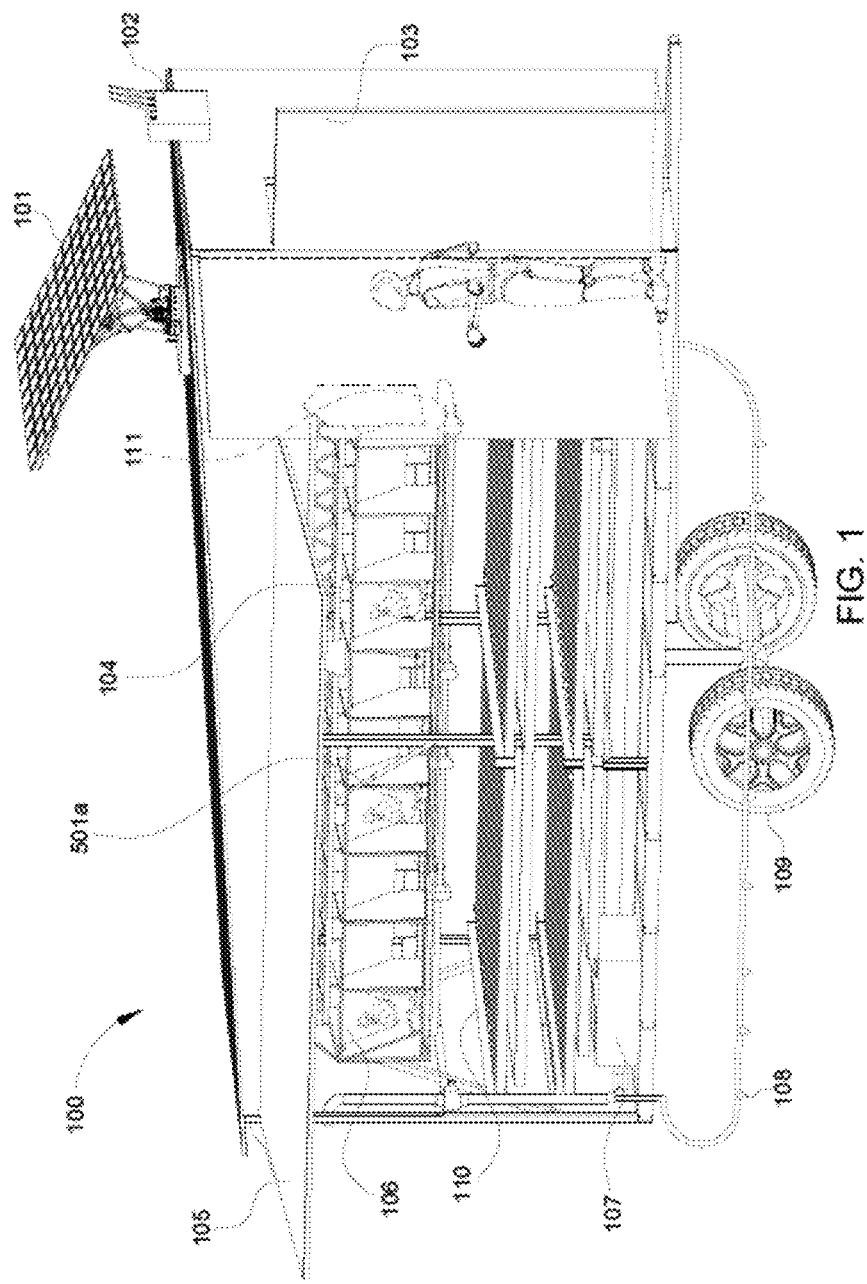

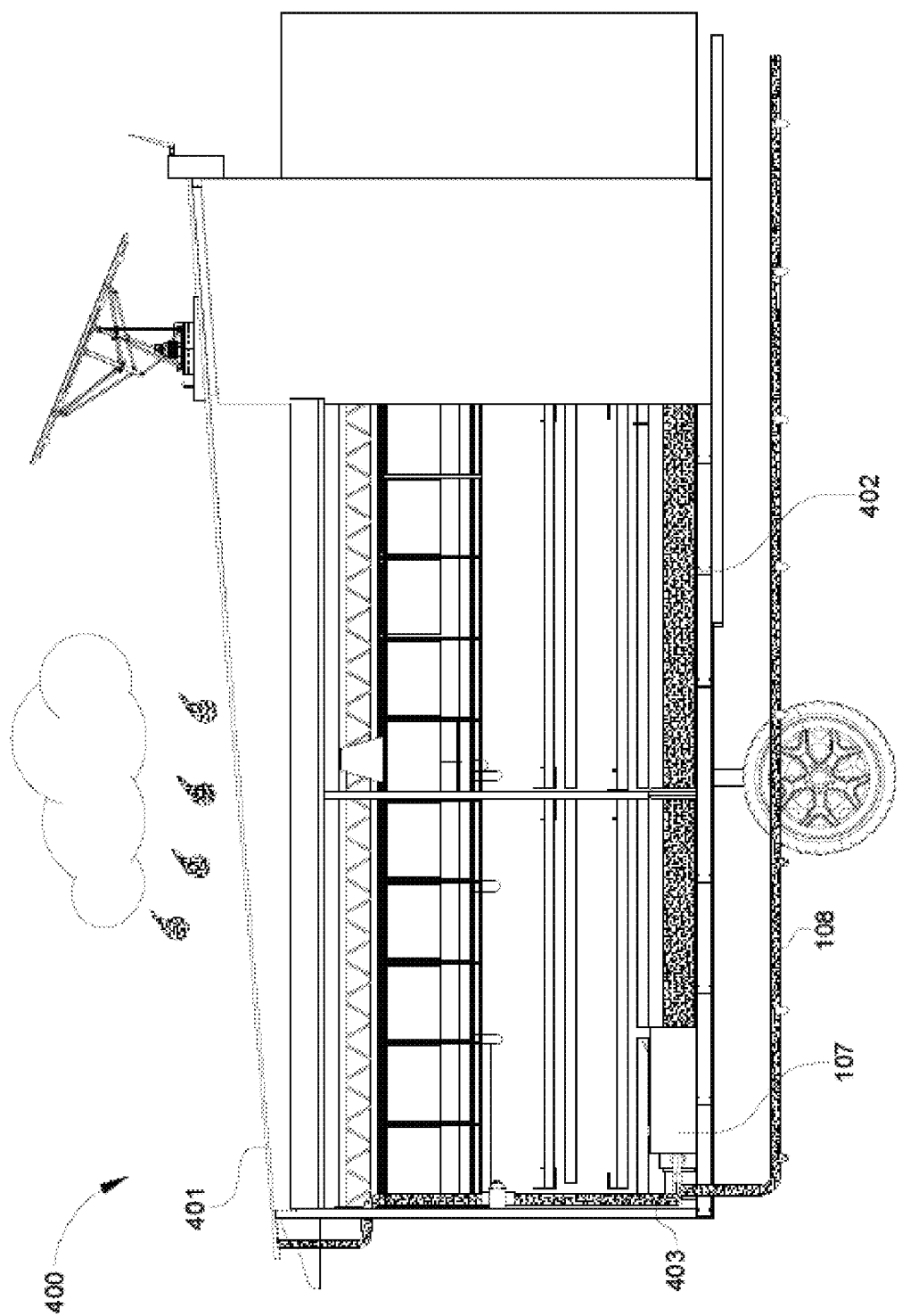

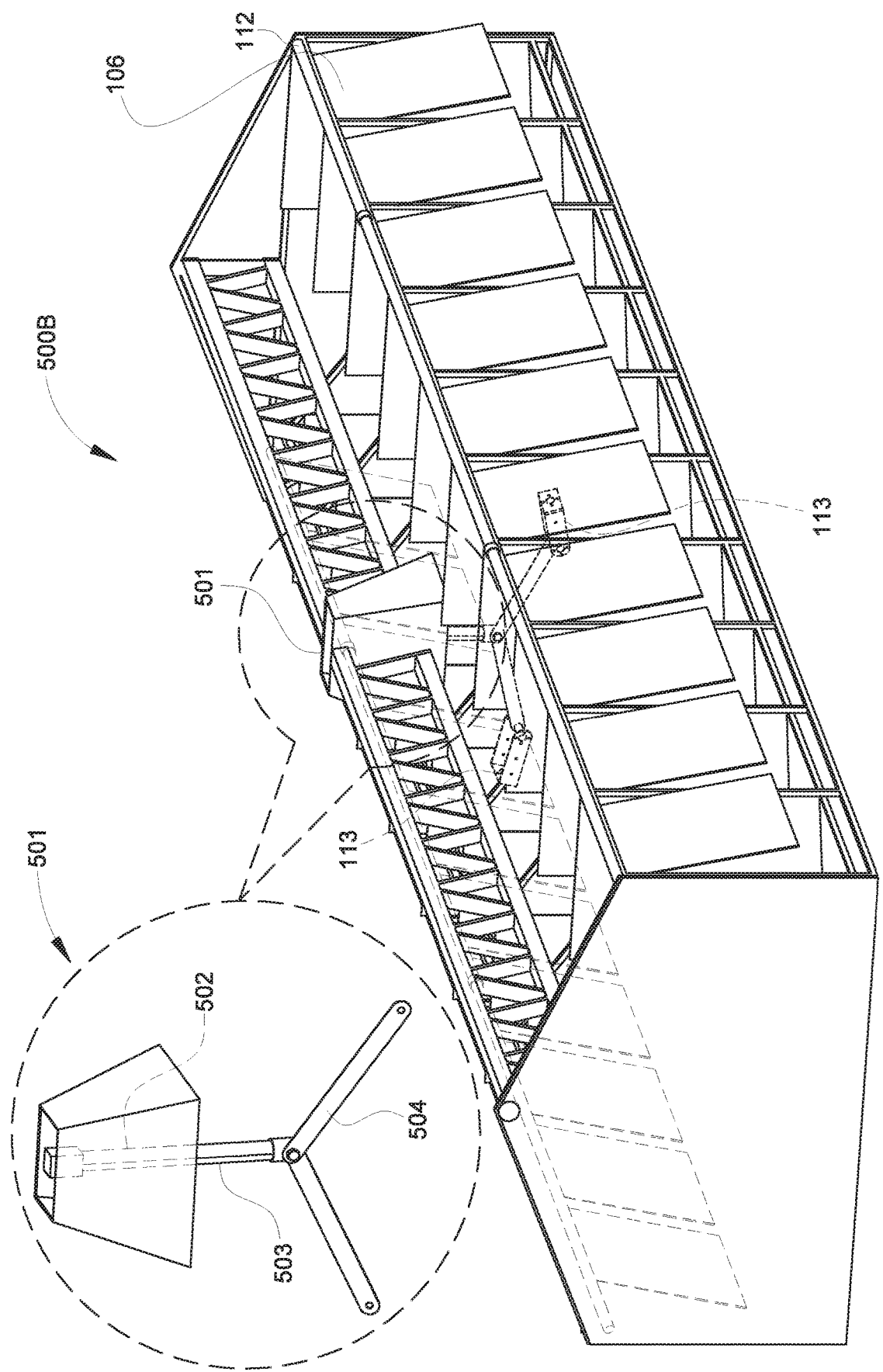

FIG. 6B

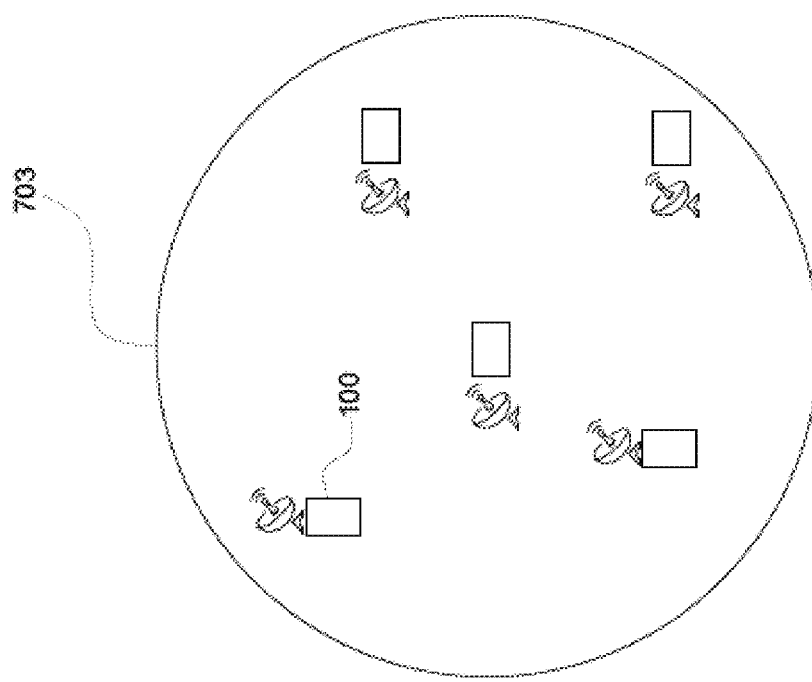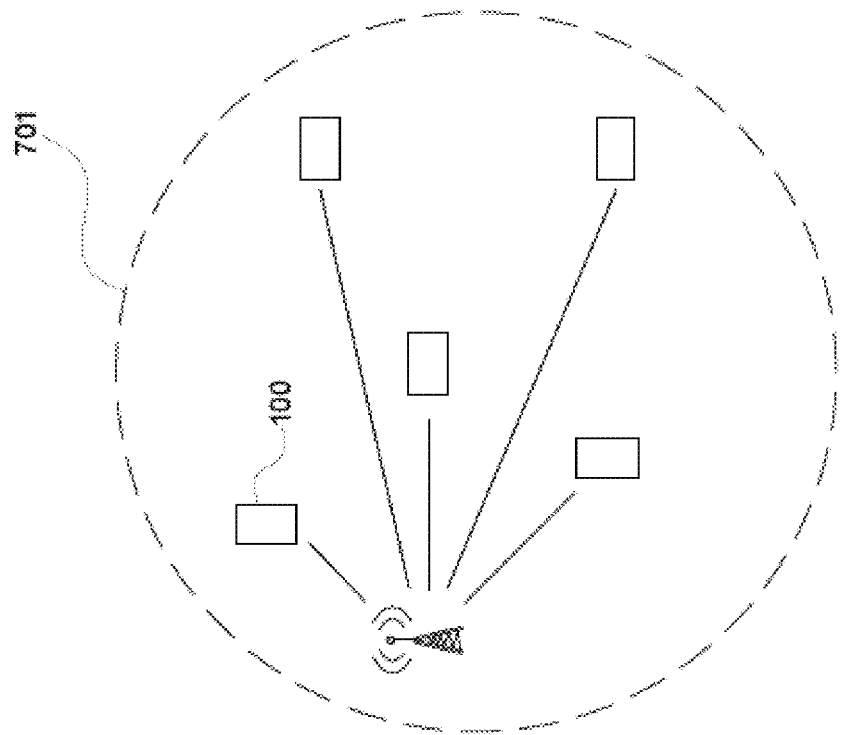
FIG. 7

CHICKEN NESTING TRAILER—CHICKEN CAMP

TECHNICAL FIELD

The embodiment herein generally relates to poultry free-range egg farming industry, more particularly invention relates to a fully automated free-range egg harvester that can be monitored and controlled from communication device.

BACKGROUND

Currently, the conventional poultry industry is developing rapidly leading to large-scale egg farming production. In the egg farming industry, the traditional poultry feed devices generally include drinking water and feeding installations but lacks the feature to monitor important parameters in real time such as temperature, alerts, events, and egg count in any communication device. The current methods used in the egg farming industry restrict outdoor access to the birds. This leads to intensive vaccination and antibiotic programs, so the birds can grow and develop in such constraint conditions. Outdoor access is critical for the bird development and their immune system, it allows production of healthier food and also satisfies the animal welfare ethics within our food production systems.

Conventional nest boxes currently available in the market do not have the automatic collection of eggs feature. These are conventional nests where breeder needs to enter the chicken coop to pick up eggs by hand. A major disadvantage of conventional nests is the additional washing process that is added as the eggs become dirty when chickens are allowed to sleep on top of the eggs during night-time. These represent higher labour and raw material costs for the farmer. Further, the most known disadvantage of the conventional egg farming business is the high CAPEX required to build fixed infrastructure to house the chickens. Fixed infrastructure costs are directly linked to land ownership, which is the most know impediment for your people to join any farming business. The mobility feature of the present invention allows for any investor to enter the farming business without the drawback of land ownership as land can be leased or borrowed while the egg farming business is growing.

Further, the footprint generated by a conventional egg farming industry could result in severe environmental impact.

Thus, there is a need to develop a device that can overcome the above problems.

SUMMARY

In view of the foregoing, an embodiment herein describes a free grazing egg harvester device that comprises of:
  a plurality of solar panels for generating electricity;
  a communication antenna provides information to each user on communication device through an application;
  a front access door for user access in the egg collection cabin inside the free grazing egg harvester device;
  a plurality of roll away nest boxes are provided for the hens to access and lay eggs during day time;
  a side access door for opening and closing the free grazing egg harvester device; and
  a plurality of nest gates are provided for access of hens;
  a water reservoir is provided for clean water storage;
  a plurality of water nozzles are provided for feeding hens;
  a plurality of wheels are provided for towing the free grazing egg harvester device from one place to another using a tractor or vehicle;
  a plurality of roosts are provided for the chickens to sleep during the night
  wherein, an actuator is provided that has a piston which further has an extension rod, wherein the extension rod has at least two arms facilitating opening and closing of a plurality of nest gates,
  wherein, the two arms extend and contracts to close and open the plurality of nest gates respectively.

In accordance with an embodiment of the present invention, a conveyor belt is provided inside the roll away nest boxes to convey eggs to the collection area.

In accordance with an embodiment of the present invention, a plurality of poultry pads are provided on which the hens lay their eggs before they roll onto the conveyor belt.

In accordance with an embodiment of the present invention, infrared sensors 301 are provided to count eggs as they roll onto the conveyor belt.

In accordance with an embodiment of the present invention, the device has a roof that collects the rainwater.

In accordance with an embodiment of the present invention, a water storage tube is fitted inside the device to store the water.

In accordance with an embodiment of the present invention, the rainwater is filtered using a pump to suck the water from the tubes, then to pass through a sediment filter and finally through a carbon activated filter.

In accordance with an embodiment of the present invention, the filtered water is stored in a stainless-steel clean water reservoir.

In accordance with an embodiment of the present invention, the web application provides critical information to the user through any communication device. In accordance with an embodiment of the present invention, the application stores all the data locally in a hard disk and also in the virtual server, this generates daily, weekly and monthly production reports in a database.

In accordance with an embodiment of the present invention, a sensor is provided to sense the temperature inside the nest.

In accordance with an embodiment of the present invention, a sensor is provided to sense the water temperature.

In accordance with an embodiment of the present invention, the user remotely operates the device 100 through the control panel installed in the web application.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 1 illustrates a free grazing egg harvester device, in accordance with an embodiment of the present invention;

FIG. 3 illustrates a hydraulic system, in accordance with an embodiment of the present invention;

FIG. 4b illustrates the closing of the plurality of nest gates, in accordance with an embodiment of the present invention;

FIG. 6b illustrates the screenshot of the application showing the notification panel on the user's communication device, in accordance with an embodiment of the present invention; and FIG. 7 illustrates the two possible network configurations for monitoring the device, in accordance with an embodiment of the present invention.

DETAILED DESCRIPTION OF PREFERRED EMBODIMENTS

Figure 2A:
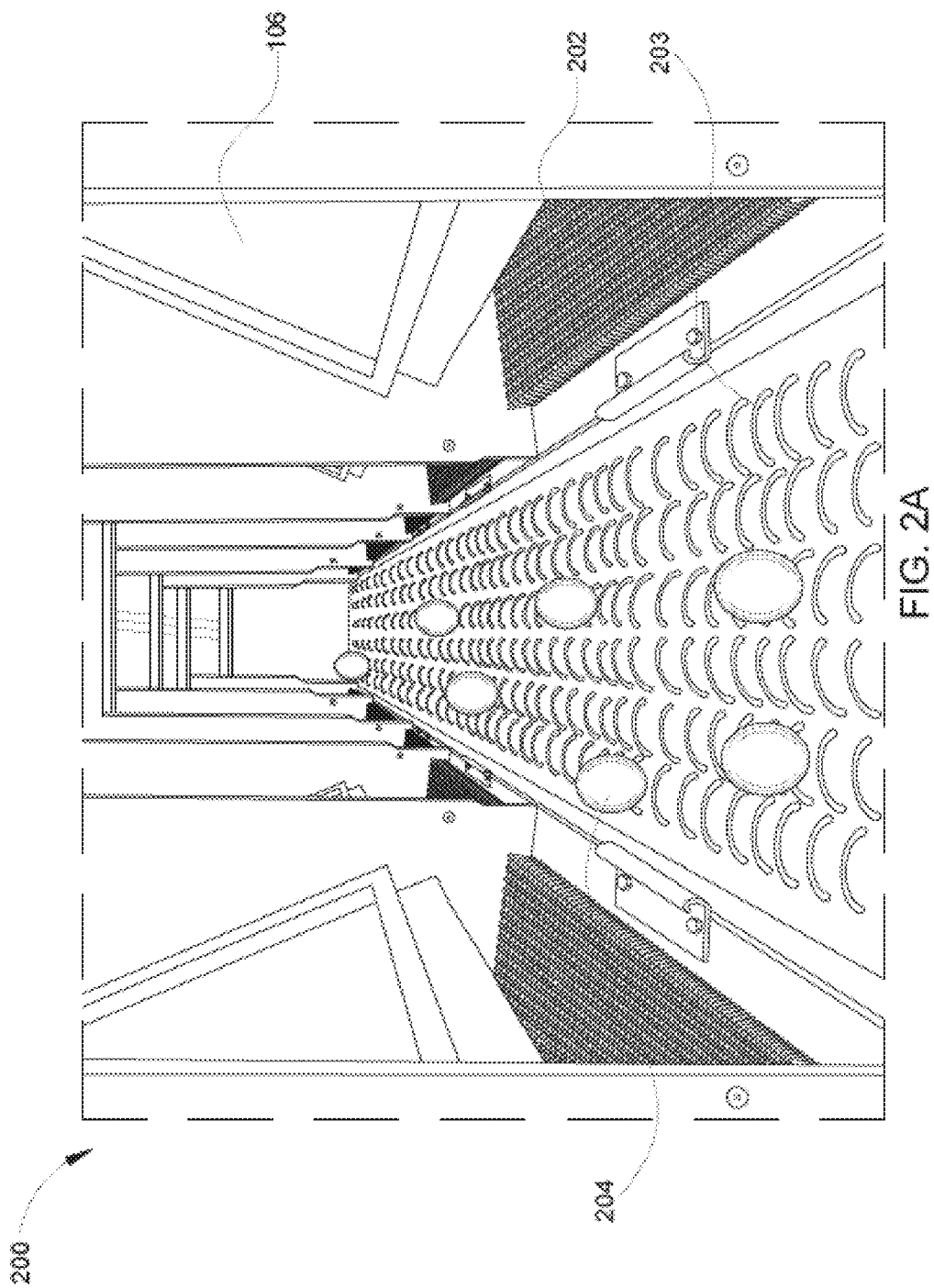
FIG. 2a illustrates a conveyor belt having eggs, in accordance with an embodiment of the present invention.

The embodiments herein and the various features and advantageous details thereof are explained more fully with reference to the non-limiting embodiments that are illustrated in the accompanying drawings and detailed in the following description. Descriptions of well-known components and processing techniques are omitted to not unnecessarily obscure the embodiments herein. The examples used here are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein achieve this by providing free grazing egg harvester device.

FIG. 1 describes a free grazing egg harvester device 100, in accordance with an embodiment of the present invention. The free grazing egg harvester device comprises a plurality of solar panel 101 that is provided to generate electricity; a communication antenna 102 that provides all the required information to the user through a mobile application; a front access door 103 that is provided for user access the egg collection cabin inside the free grazing egg harvester; a plurality of roll away nest boxes 104 that are provided for the hens to lay eggs during the day; a side access doors 105 for opening and closing the free grazing egg harvester device; a plurality of nest gates 106 for access of hens in day time; a water reservoir 107 where clean and filtered water is stored before its supplied to the hens; a plurality of water nozzles 108 installed to provide fresh and clean water to the chickens directly from the stainless steel tank; a plurality of wheels 109 are provided to tow the free grazing egg harvester device from one place to another using a tractor or a vehicle; and a plurality of roosts 110 are provided to allow hens sleep during night. An egg collection area 111 inside the cabin is also provided from where the user can collect the eggs 204.

In another embodiment, the water nozzles are also known as water drinkers.

Figure 2B:
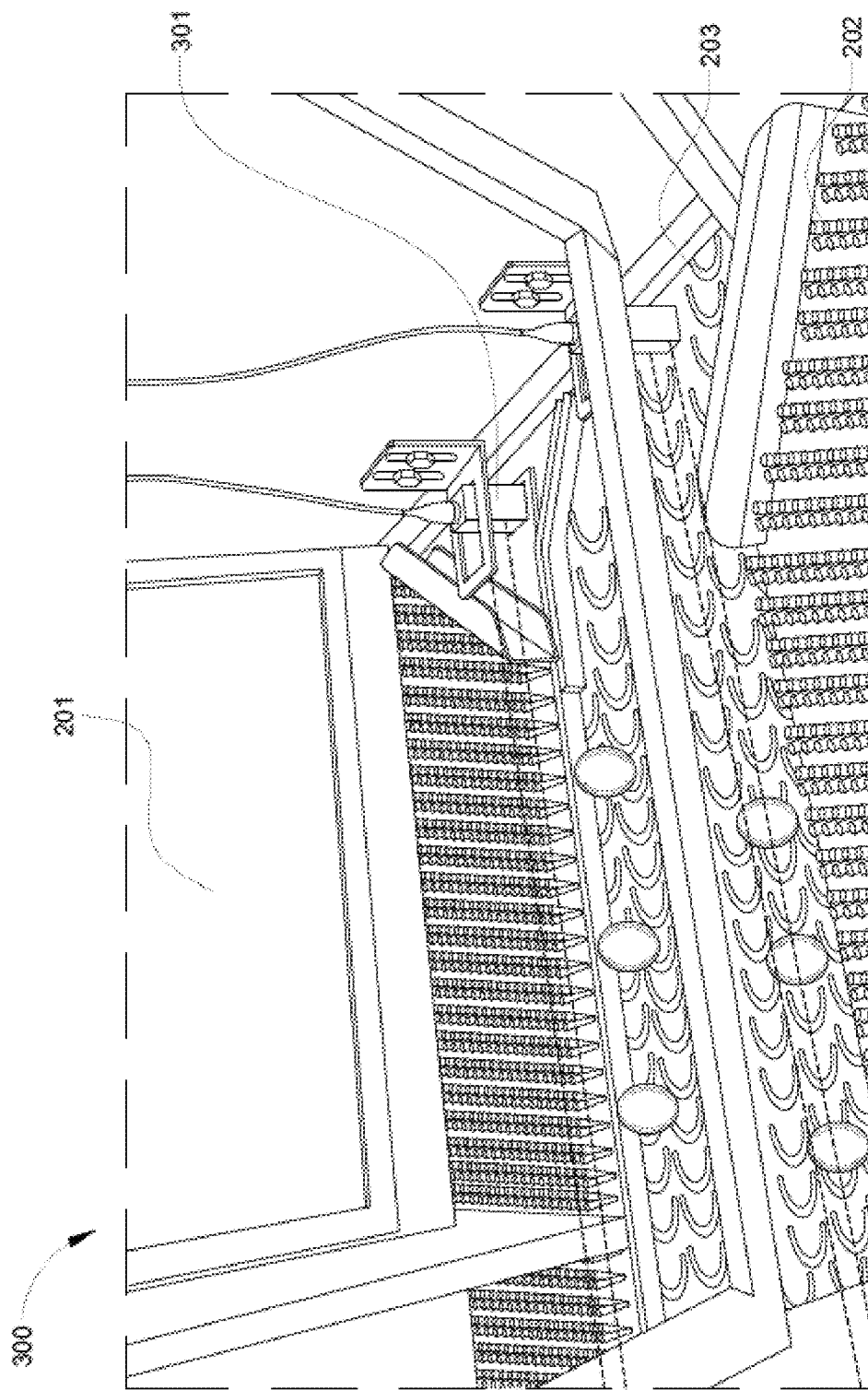
FIG. 2b illustrates a conveyor belt having infrared sensors, in accordance with an embodiment of the present invention.

FIGS. 2a and 2b describe a conveyor belt 203 having eggs 204 and infrared sensor 301 respectively, in accordance with an embodiment of the present invention. The nest gates 106 are allowed to open during day time so that the hens get access inside the roll away nest boxes 104. A conveyor belt 203 is provided inside the roll away nest boxes 104, the hens lay the eggs 204 inside the nests which have an inclined slope that will make the egg roll to the conveyor belt 203. Additionally, the poultry nest pads 202 are provided to protect the eggs from getting dirty and also to give the hens a sensation of a nest. Infrared sensors 301 are provided to count the eggs 204 as they roll on the conveyor belt 203. The infrared sensor emits infrared light along the entire length of the roll away nest structure 500A and every time this light is interrupted the logic program installed in the motherboard microcontroller increases the egg count in real time. This is how the eggs are counted when they fall in the conveyor belt 203.

FIG. 3 describes a hydraulic system 400, in accordance with an embodiment of the present invention. The hydraulic system 400 is provided to store the rainwater and make it drinkable for the hens. The roof 401 of the device 100 collects the rainwater and passes the rainwater to a water storage tube 402. The water storage tube is fitted inside the device 100 to store the rainwater. The rainwater is then filtered 403 using a pump that uses the water from the storage tubes and pushes it through a sediment filter and then through an activated carbon filter as the last filtering phase. The filtered water is then stored in the clean stainless-steel water reservoir 107. The size of the water storage tubes is 4 inches in diameter and have a total capacity of 200 liters. The clean stainless-steel water reservoir 107 has 70 liters of storage capacity.

Figure 4A:
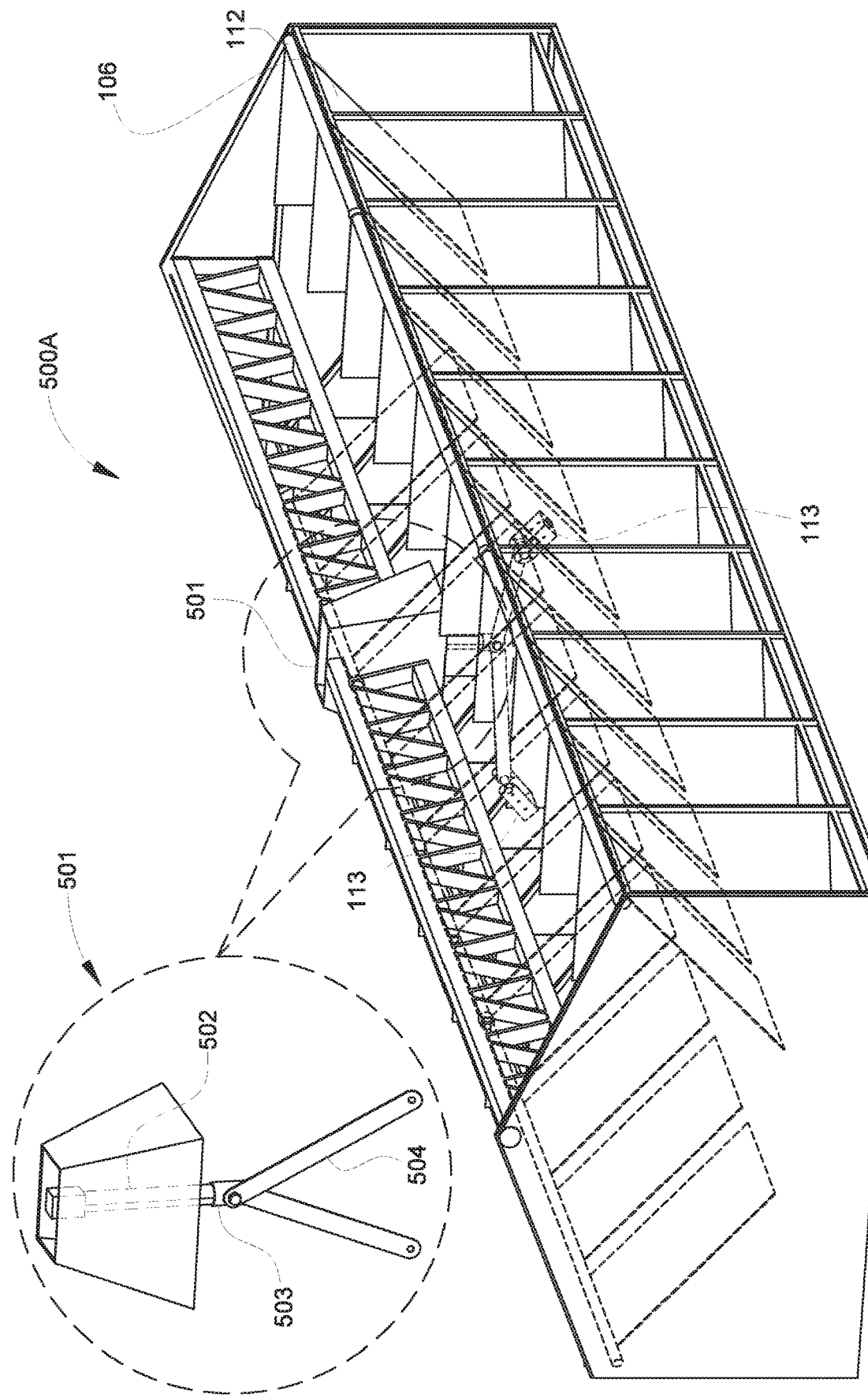
FIG. 4a illustrates the opening of the plurality of nest gates, in accordance with an embodiment of the present invention.

FIGS. 4a and 4b (including nesting gates rod 112 and bracket 113) describe the opening and closing of the plurality of nest gates 106 respectively, in accordance with an embodiment of the present invention. An actuator 501 is provided to open and close the plurality of nest gates 106. The actuator 501 has a piston 502 that acts as an extension rod 503. The extension rod 503 has two respective arms 504 that are used to push/pull each pair of opposite nest gates of the plurality of nest gates 106 by extending and contracting the extension rod 503. When the extension rod 503 gets extended, then the plurality of nest gates 106 are closed. When the extension rod 503 gets contracted, then the plurality of nest gates is opened.

Figure 5:
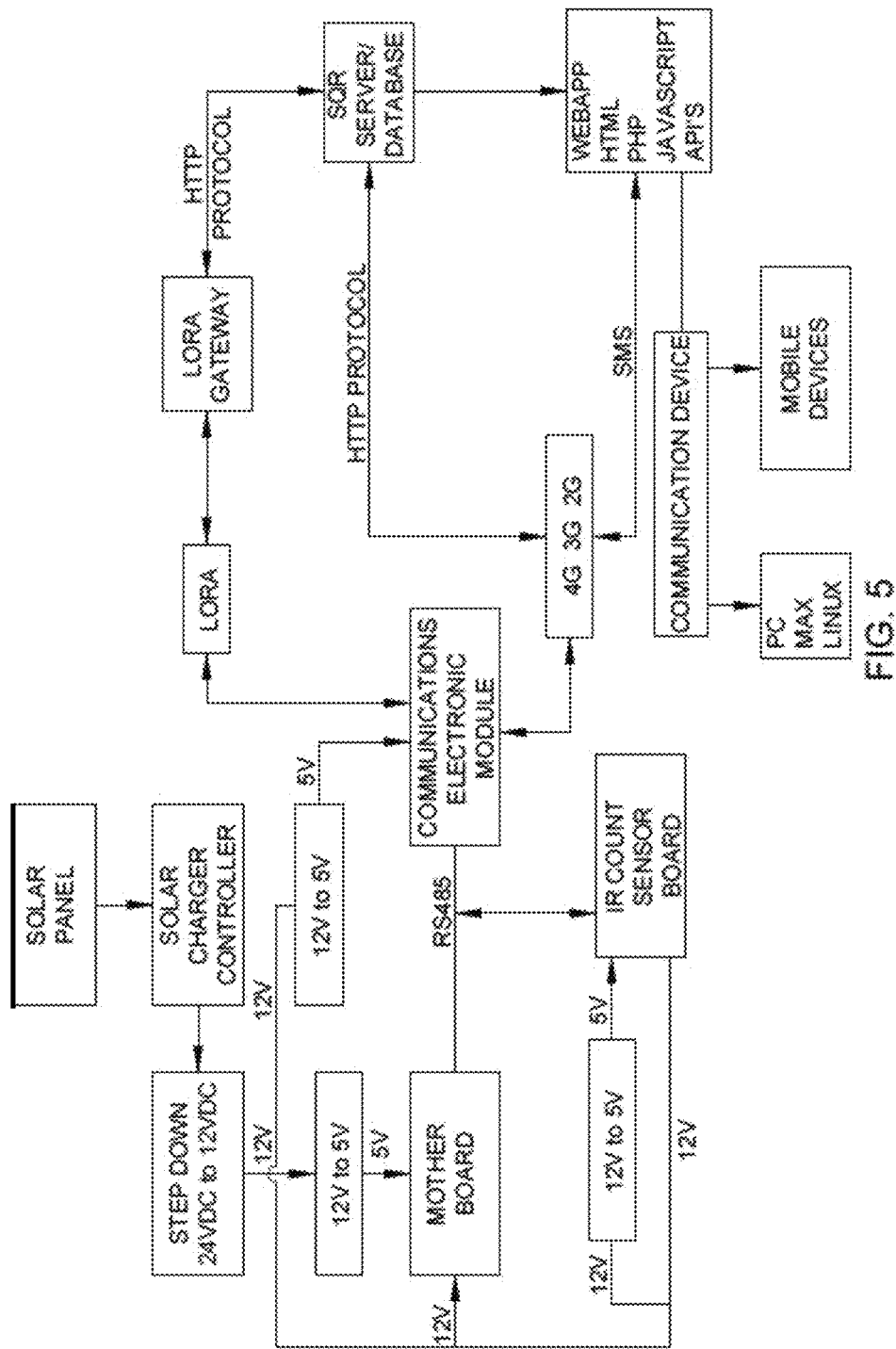
FIG. 5 illustrates a schematic automation, in accordance with an embodiment of the present invention.

FIG. 5 describes a schematic diagram of automation, in accordance with an embodiment of the invention. All the electronic devices are handled by microcontroller installed in the motherboard. All the sensors are connected to the microcontroller. These sensors give inputs to the microcontroller about the temperature of the nest, water, egg counts, doors, etc. The microcontroller communicates using RS485 protocol to a communication's electronic module which transmits all the data via satellite (cellular network) to an SQL server. The data stored in the SQL server is then interpreted by the Web app program so that it could be visible in real time in any communication device for all registered users.

Figure 6A:
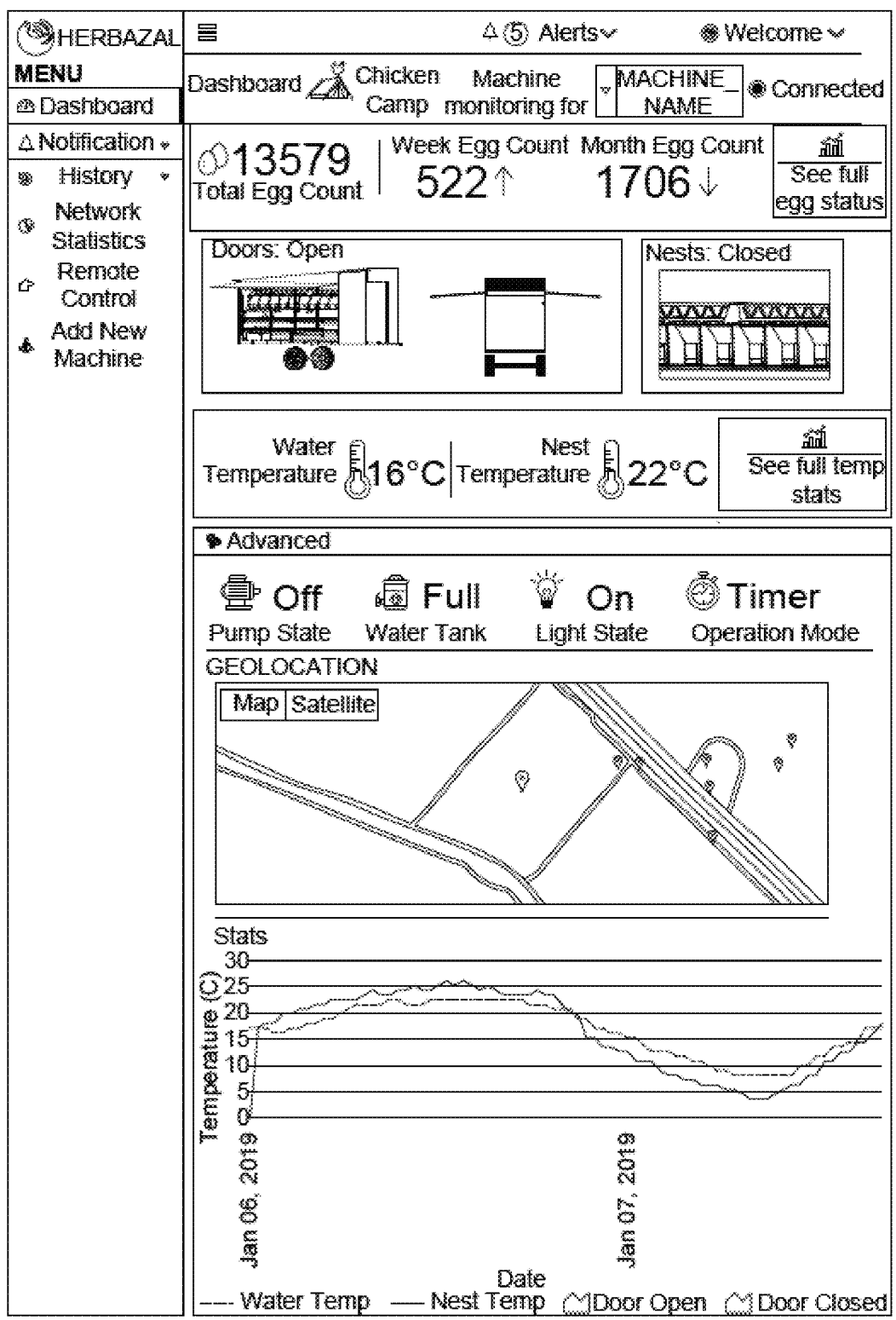
FIG. 6a illustrates the screenshot of the web application where users can view in real time information such as temperatures, egg production statistics, alarms, historical events, control panel, etc., in accordance with an embodiment of the present invention.
Figure 6B:
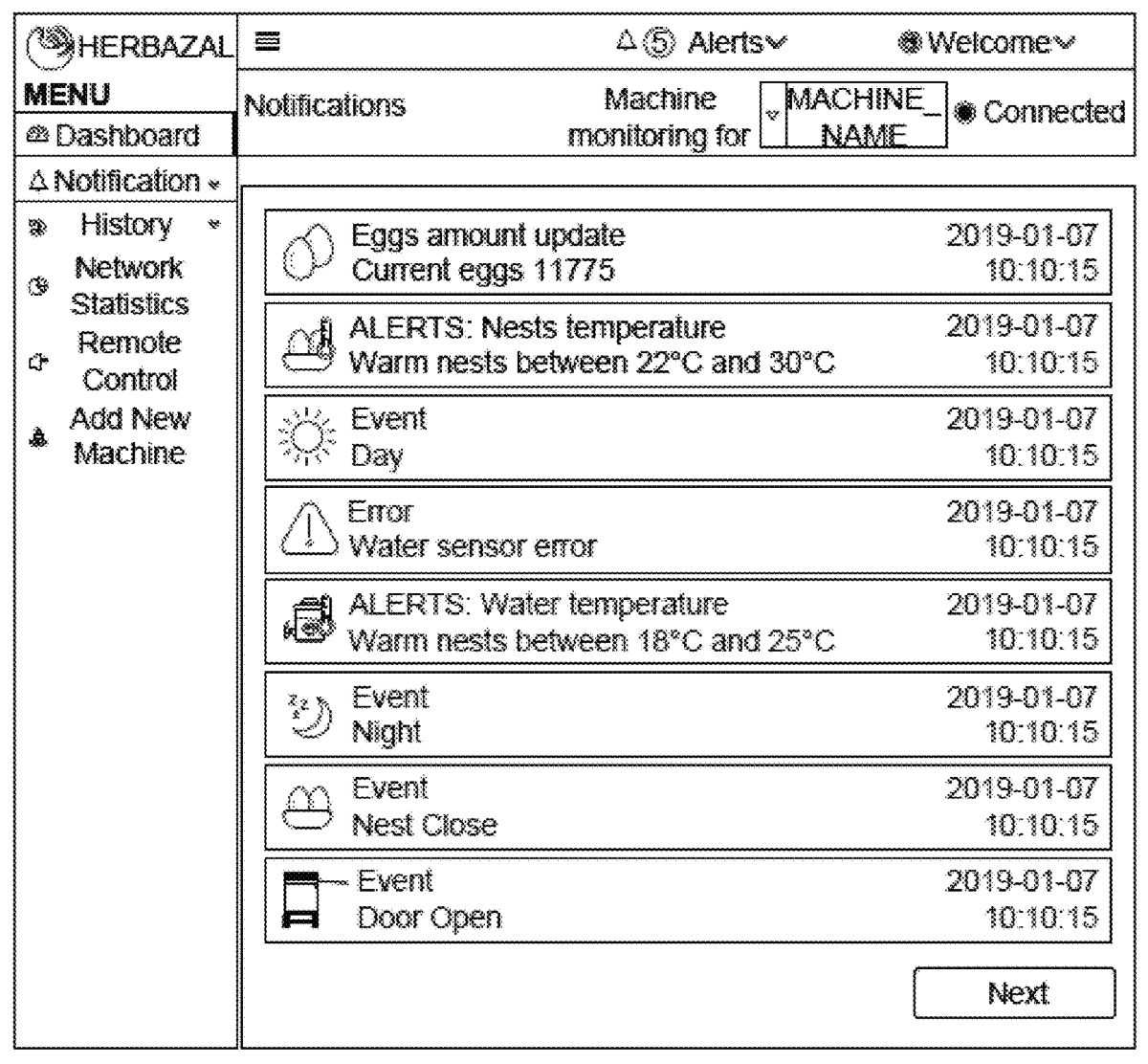

FIGS. 6a and 6b illustrate the screenshot of the application showing the web application where users can view in real time information such as temperatures, egg production statistics, alarms, historical events and notifications on user's communication device, in accordance with an embodiment of the present invention. The web application menu has a dashboard, notification, history, network statistics, remote control, and control panel available for users. The user gets a notification about critical events such as egg count production statistics with monthly and weekly and daily updates via a registered email and also available in the application. Alerts showing nest temperature, drinking water temperature, day and night notification, and error warnings regarding the failure of any sensor are also available. All the data is stored locally in the device and in a virtual database for online viewing and download. The user can also operate the device manually from the egg collection cabin or by using the web application control remote option.

FIG. 7 describes the two possible network configurations for monitoring the device. The first networking configuration 701 for monitoring the device is by LAN, which includes the use of telecommunication antennas with a transmission distance of 8 kilometers to a monitoring station where information is viewed and stored. The second networking configuration 703 is for those areas with cellular area coverage, where the machine automatically transmits the data to an SQL server where the information is interpreted and stored in a Web app.

In an embodiment, the present invention provides many advantages such as reduction in fixed infrastructure costs, it replaced a labor-intensive approach for a monitoring philosophy approach, remote business performance monitoring, sustainable farming methods, clean egg production which reduces the washing process applied to conventional egg production, grid energy autonomy storage and filtration of rainwater and real-time remote data transmission.

In an embodiment, the device is not limited to, but also has a robust design, rainproof, windproof and extreme temperature protection. Additionally, the protection from aerial predators during the day and refuge bird during the night. The device can be made in many designs according to the user requirements/needs, up to 16 meters in length. The material for making the device is light in weight and can easily be towed with a mini tractor. In an embodiment, the device allows young people, who do not own land, to be able to rent it and start their business in free-range egg farming. Additionally, there is no need to build a fixed infrastructure as the device is portable and fully automated.

In an embodiment, real-time transmission of all the parameters that matter to the egg farmer, such as temperatures, egg production statistics, water tank levels, door, and nests status is done. The communication antenna 102 is provided for wireless communication with the satellite that sends all the information to the user through the application.

In an embodiment, the hens sleep in the roosts 110 during the night.

In an embodiment, the water storage tube has a capacity of 200 liters and each end is detachable so that tubes can be cleaned easily.

In an embodiment, the communication device includes, but not limited to PC, mobile etc.

In another embodiment, the device 100 is adapted with a simple actuator 501a, with a single arm, to facilitate opening and closing of the side access door during morning and night respectively. In another embodiment, the opening and closing of the side access doors 105 is automated with a timer for definite hours of the day depending on the user requirement. The doors are controlled manually as well as via application.

As mentioned, there remains the foregoing description of the specific embodiments that will fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A free grazing egg harvester device comprising:
   a plurality of solar panels to generate electricity;
   a communication antenna providing information to a mobile device of a user through an application;
   a front access door for user access in the free grazing egg harvester device;
   a plurality of roll away nest boxes being provided to access chickens during daytime;
   a side access door for opening and closing the free grazing egg harvester device which gives the chickens outdoor access;
   a plurality of nest gates for allowing chicken access to the plurality of roll away nest boxes during day time;
   a water reservoir for clean water storage;
   a plurality of water nozzles being installed to provide drinking water to the chickens;
   a plurality of wheels being provided to tow the free grazing egg harvester device from one place to another; and
   a plurality of roosts being provided to allow the chickens to sleep inside the free grazing egg harvester device during night time;
   wherein an actuator is provided; wherein the actuator comprises a piston; wherein the piston comprises an extension rod;
   wherein the extension rod comprises two respective arms facilitating opening and closing of each pair of opposite nest gates of the plurality of nest gates; and
   wherein the two respective arms extend and contract to close and open each pair of opposite nest gates of the plurality of nest gates.

2. The free grazing egg harvester device as claimed in claim 1,
   wherein a conveyor belt inside the plurality of roll away nest boxes conveys eggs to an egg collection area;
   wherein the egg collection area is inside the free grazing egg harvester device;
   wherein a plurality of poultry pads are provided on which the chickens lay their eggs before they roll onto the conveyor belt;
   wherein infrared sensors are provided to count the eggs as they roll onto the conveyor belt;
   wherein the free grazing egg harvester device has a roof that collects rainwater;
   wherein a water storage tube is fitted inside the free grazing egg harvester device to store the rainwater;
   wherein the rainwater is filtered using a pump to suck the rainwater from the water storage tube and pass through a sediment filter followed by an activated carbon filter; and wherein the filtered rainwater is stored in the water reservoir.

3. The free grazing egg harvester device as claimed in claim 1, wherein the application provides information to the user from a communication device;

wherein the application stores data in a hard disk drive and in a virtual server to generate daily, weekly and monthly reports in a database;

wherein a sensor senses a temperature inside the plurality of roll away nest boxes;

wherein another sensor senses a water temperature; and wherein the user remotely operates the free grazing egg harvester device through a control panel installed in the application.

* * * * *